July 28, 1959 W. HOTINE 2,897,426
CONSTANT PERCENTAGE STEP POTENTIOMETER SERVOMECHANISM
Filed Oct. 25, 1957 4 Sheets-Sheet 2
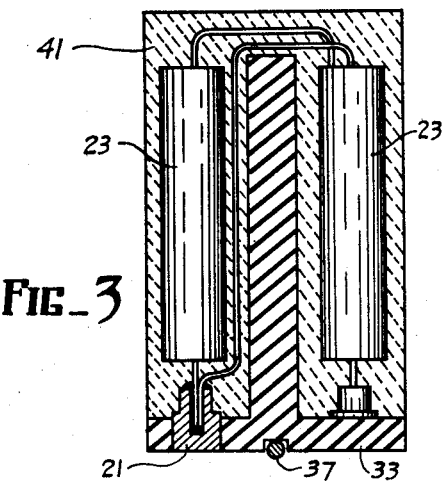
FIG_3
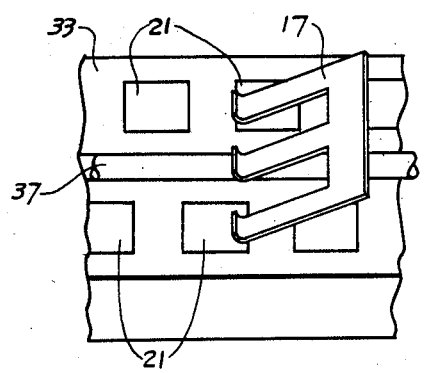
FIG_4
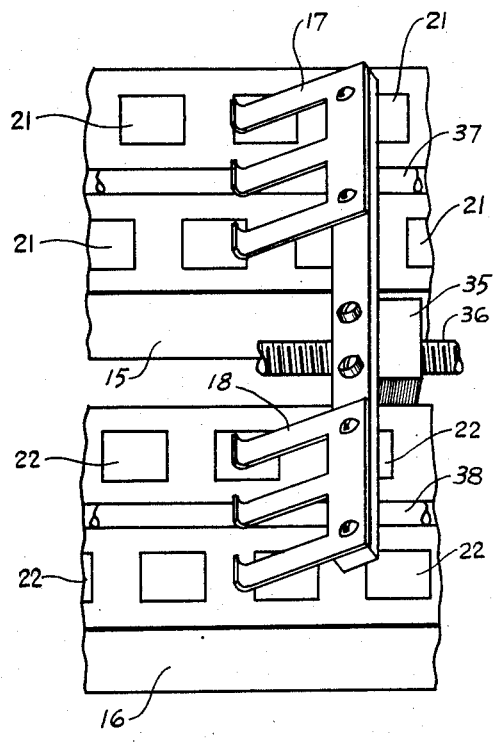
FIG_5
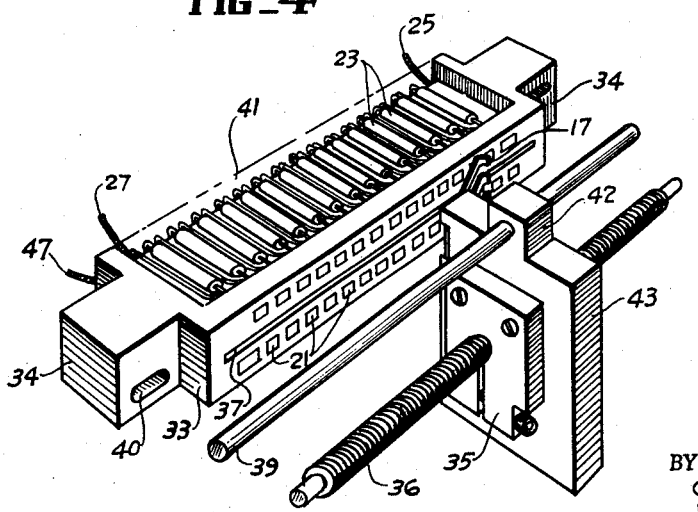
FIG_2
INVENTOR.
WILLIAM HOTINE.
BY
ATTORNEY.

July 28, 1959        W. HOTINE        2,897,426
CONSTANT PERCENTAGE STEP POTENTIOMETER SERVOMECHANISM
Filed Oct. 25, 1957        4 Sheets-Sheet 3
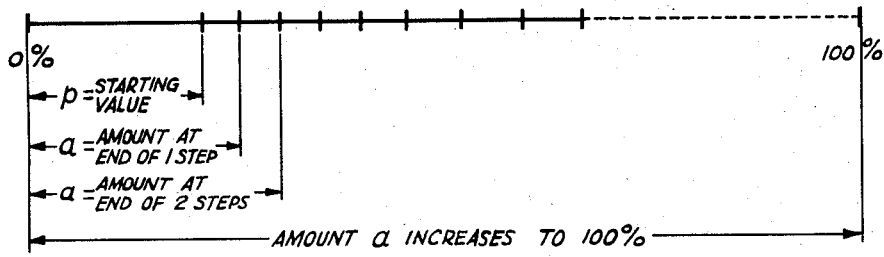
FIG_9
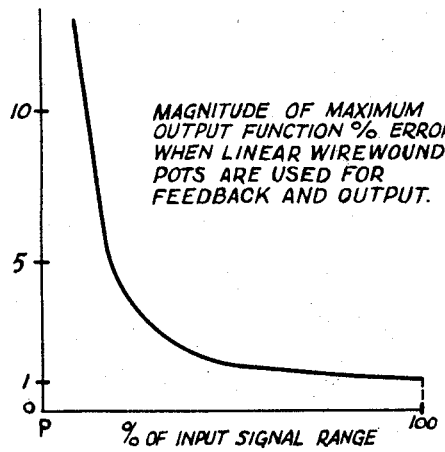
FIG_7
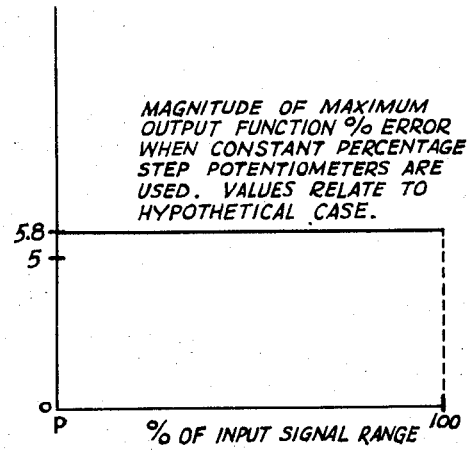
FIG_8
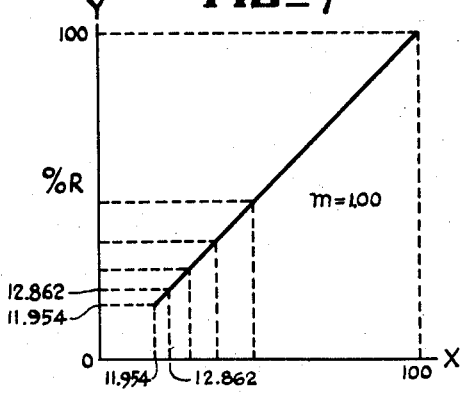
FIG_6
INVENTOR.
WILLIAM HOTINE.
BY
ATTORNEY.

July 28, 1959   W. HOTINE   2,897,426
CONSTANT PERCENTAGE STEP POTENTIOMETER SERVOMECHANISM
Filed Oct. 25, 1957   4 Sheets-Sheet 4
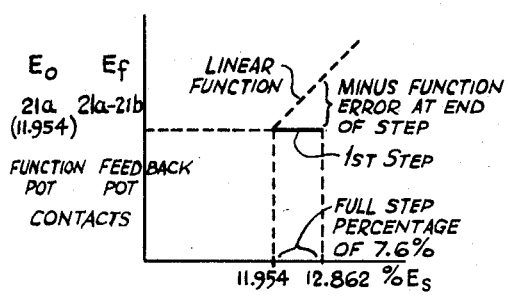
FIG_10
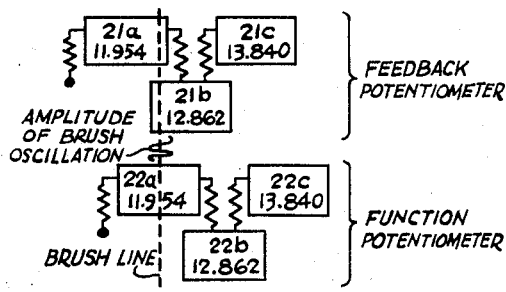
FIG_11   1ST. STEP CONTACT ALIGNMENT.
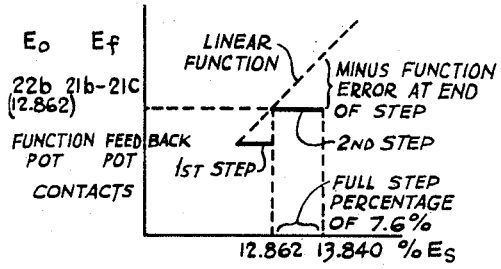
FIG_12
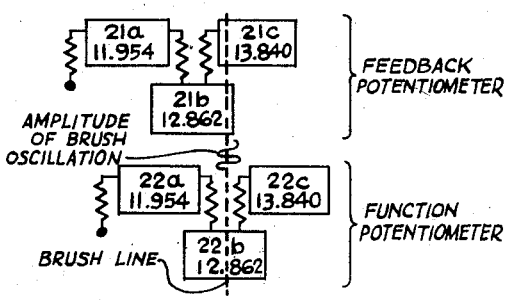
FIG_13   2ND. STEP CONTACT ALIGNMENT.
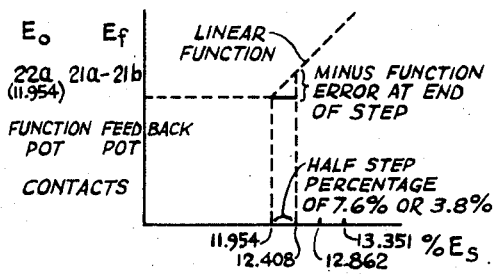
FIG_14
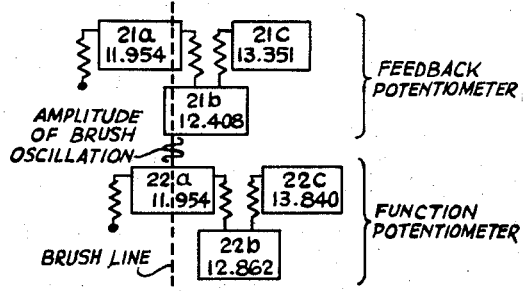
FIG_15   1ST STEP CONTACT ALIGNMENT
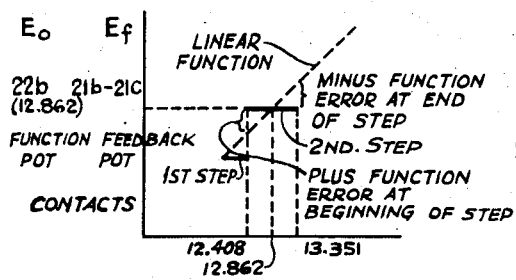
FIG_16
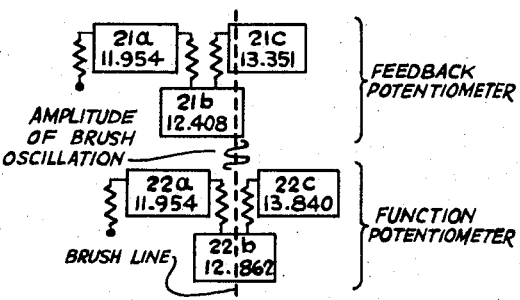
FIG_17   2ND. STEP CONTACT ALIGNMENT
INVENTOR.
WILLIAM HOTINE.
BY
ATTORNEY.

United States Patent Office 2,897,426
Patented July 28, 1959

2,897,426

CONSTANT PERCENTAGE STEP POTENTIOMETER SERVOMECHANISM

William Hotine, Beaumont, Calif., assignor to General Dynamics Corporation, San Diego, Calif., a corporation of Delaware Application October 25, 1957, Serial No. 692,332

11 Claims. (Cl. 318—28)

This invention relates to a constant percentage step potentiometer servomechanism and more particularly to a servomechanism utilizing constant percentage step tap-switching potentiometers.

Translating systems of the type which furnish an electrical output quantity which is a function of an electrical input quantity are commonly termed computer servomechanisms and utilize wire-wound potentiometers as computing elements. These systems are limited in accuracy at small values of the input quantity due to potentiometer non-linearity. This non-linearity may be a small percentage of the full scale value but it causes a large percentage of error of small nominal values.

The present invention is an improved system free from this disadvantage.

An object of this invention is to provide a novel electrical translating system having a constant low percentage of error throughout the entire range of the input quantity.

Another object is to provide a servomechanism which utilizes a tap-switching type of potentiometer with each tap corresponding to an individual electrical resistance value.

Another object is to provide a servomechanism which employs a tap-switching type of potentiometer having a constant percentage of increase in resistance between successive taps.

Another object is to provide a computer servomechanism which can furnish linear or non-linear output functions of the input quantity while utilizing constant percentage tap-switching potentiometers.

Another object is to provide a servomechanism which can produce a digital output function while utilizing constant percentage tap-switching potentiometers.

Other objects and features of the present invention will be readily apparent to those skilled in the art from the following specification and appended drawings wherein is illustrated a preferred form of the invention, and in which:

Figure 2 is a perspective view of a tap-switching potentiometer element with switching and mechanical driving elements also shown.

Figure 3 is a section through the potentiometer element of Figure 2.

Figure 4 is an enlarged view of a portion of the face of a tap-switching potentiometer element showing contacts and switching brushes.

Figure 5 is a diagram illustrating the ganging of a plurality of tap-switching potentiometer elements.

Figure 6 is a graph showing the relationship between output and input quantities.

Figure 7 is a graph showing the variable percentage of error of a conventional wire wound potentiometer servo computer.

Figure 8 is a graph showing the constant percentage of error of nominal value of the present invention.

Figure 9 is a graphical representation of the derivation of the integral resistance values to be substituted in the potentiometer.

Figure 10 is a graph illustrating the various potentiometer brush contact positions corresponding to a particular input signal.

Figure 11 is a schematic of the contacts and brushes showing their relative positions as indicated by the graph in Figure 10.

Figure 1:
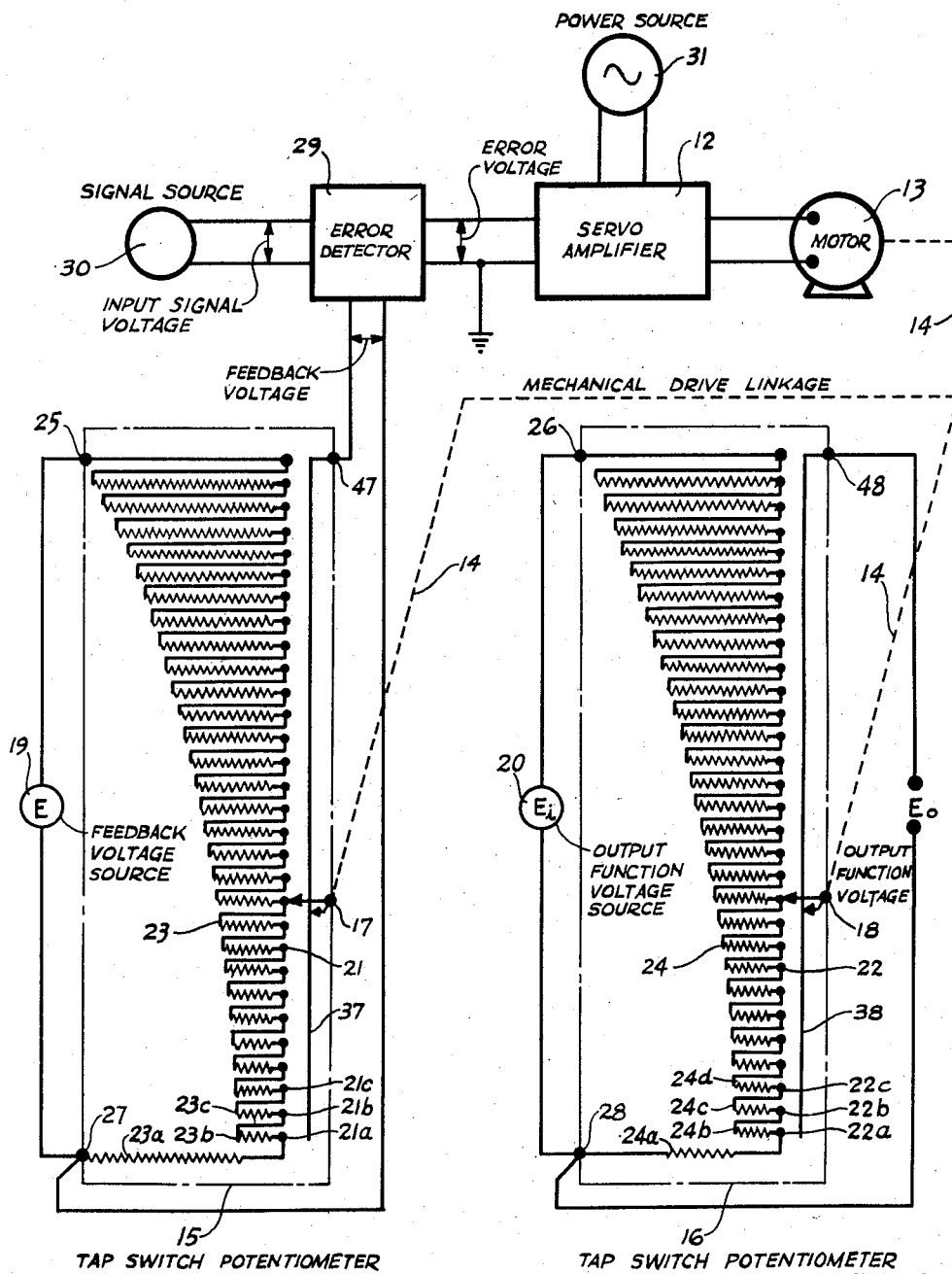
Figure 1 is a simplified schematic diagram of the electrical circuit of a novel computer servomechanism employing tap-switching potentiometer elements.

Figures 12 and 13, 14 and 15, 16 and 17 are similar to Figures 10 and 11 but have the brushes moved to successive contacts or taps.

A preferred mechanical construction of the tap-switch potentiometer elements is shown in Figures 2, 3 and 4. In the perspective view of Figure 2, a rectilinear type of construction is illustrated. This type of construction gives an advantageous space factor together with ease of accessibility of elements. An insulating switch body 33 carries square contacts 21 which are flush with the surface. The contacts 21 are placed on the face of body 33 in two rows, with the rows staggered, to provide a long leakage path between contacts. An enlarged view of the contacts is shown in Figure 4. A trolley wire 37 is also placed on the face of body 33 between the two rows of contacts. Resilient switch contact brushes 17 are electrically connected in parallel and are supported by insulating block 43 and insulated from nut 35 which travels along screw 36. Screw 36 rotates in fixed bearings, not shown, and is driven by a servomotor. Nut 35 is held from rotating by arm 42 which can slide longitudinally along rod 39. Switch body 33 is provided with mounting lugs 34 and is hollow to provide mounting space for resistors 23. Resistors 23 are connected to contacts 21 and to input terminals 25 and 27 according to the diagram of Figure 1. The trolley wire 37 extends to the rear and is the output connection of switch 17. An elongated hole 40 in lug 34 enables lateral adjustment of the body 33 so that ganged units can be aligned or staggered as shown in Figure 5. Block 43 is large enough to provide for mounting a plurality of brushes 17 when a number of potentiometer units are ganged. A large number of switch bodies may be placed alongside the screw axis to be switched by a multiple brush assembly.

The contacts 21 are preferably square to allow for lateral misalignment of the brushes. The contacts are designed to mechanically overlap by a small amount. This can be accomplished by the use of a staggered double row of contacts in which the individual contact width is slightly greater than the spacing between contacts. Referring to Figure 4, which is an enlarged view of the contacts, three resilient brushes 17 are provided for the two rows of contacts and for the trolley wire 37. The three brushes 17 are in line. The materials used for the contacts and brushes should be chosen to resist wear and corrosion. The materials chosen should also be such as to generate negligible electrical noise. In this way, electrical noise, dirt and wear problems associated with previous conventional potentiometer systems can be minimized.

In Figure 2, the hollow switch body 33 which contains the resistors 23 is filled with a potting compound 41 to hermetically seal it and thus give permanent mechanical and environmental protection to the unit. This construction results in a very rugged unit capable of operating under very adverse environmental conditions without harm, in contrast to previous potentiometer elements. However, other types of switching potentiometers may be used with this invention. A single row of contacts may be employed with make before break operation obtained by the use of two brushes which overlap the gap between individual contacts. A rotary type of switch may be employed successfully. Other variations in the type of switch are possible also.

As individual resistors for the novel translating system potentiometers can be procured in any desired value, the choice of potentiometer impedance levels is practically unlimited. This is in contrast to the restricted choice of impedance levels when using conventional potentiometers in previous systems.

Referring to the drawings, and in particular Figure 1, 29 indicates an electrical mixing device commonly called an error detector, shown in block diagram form, which compares the feedback voltage $E_f$ fed into it from terminals 47 and 27 of tap switch potentiometer 15, with the input signal voltage $E_s$ fed into it from the signal source 30. The output of error detector 29 is an error voltage $E_e$ which is the differential between the input signal voltage $E_s$ and the feedback voltage $E_f$. Error detector 29 may be of any well known type, such as a resistance network. The error voltage $E_e$ is fed to the input of amplifier 12, shown in block diagram form, the output of which drives servo motor 13. Power source 31 supplies power to amplifier 12. The servo motor 13 drives the switches 17 and 18 of potentiometers 15 and 16 respectively by means of a mechanical linkage denoted by the dashed lines 14. Potentiometers 15 and 16 are denoted in block diagram form by the dotted rectangular enclosures. The mechanical linkage 14 may consist of gears, a screw and nut, or any suitable mechanical driving system. Switches 17 and 18 are driven in unison by motor 13 through linkage 14 in a direction to reduce the error signal $E_e$ applied to the input of amplifier 12.

The tap-switching potentiometers 15 and 16 are constructed of individual resistors 23 and 24 respectively, connected in series as shown in Figure 1, with taps brought out from the resistor interconnections to a series of contacts 21 and 22 respectively. Switches 17 and 18 can connect any of the contacts 21 or 22 to trolley wires 37 and 38 respectively, which are connected to terminals 47 and 48.

The input terminals 25 and 27 of feedback potentiometer 15 are connected to a source 19 of feedback supply voltage E. The input terminals 26 and 28 of output function potentiometer 16 are connected to a source 20 of output supply voltage $E_i$.

The output voltage $E_f$ of the feedback potentiometer 15 is taken from terminals 47 and 27 and is applied to the error detector 29. The output voltage $E_o$ of the function potentiometer 16 is taken from terminals 48 and 28.

The resistors 23 are connected in series to form the resistance network of potentiometer 15. The resistance value of the first resistor 23a and the resistance values of the successive resistors in the network are such that the total resistance at each succeeding tap increases by a constant percentage value. The resistors 24 are connected in series to form the resistance network of potentiometer 16. The resistance values of successive resistors in the network are such that the total resistance at each succeeding tap increases by a constant percentage value just as in potentiometer 15.

The feedback potentiometer 15 may be adjusted at servo null (minimum input signal) to supply an output voltage $E_f$ equal to and opposite in polarity to the input signal voltage $E_s$. As voltages $E_f$ and $E_s$ are added algebraically in error detector 29, the resultant error voltage $E_e$ applied to amplifier 12 at servo null condition is zero.

Under static conditions then, the output voltage $E_f$ of the feedback potentiometer 15 at any nominal value of input signal voltage $E_s$ would be therefore equal in voltage, and opposite in polarity to the input signal voltage $E_s$, when the servo is in a balanced condition. The switch position of tap-switch 17 will establish the values of the resistors in a voltage divider, the output of which is equivalent to the input signal $E_s$. Simultaneously, the ganged tap-switch 18 of the output function potentiometer 16 will establish resistor values for the output function $E_o$ at this value of the input signal voltage $E_s$. Let us assume switch 17 is on contact 21a, and switch 18 is on contact 22a, under static conditions.

If a small increase in input signal $E_s$ takes place at this time, the resultant small error voltage $E_e$, amplified by amplifier 12, will cause servo motor 13, through linkage 14, to drive the feedback potentiometer tap-switch 17 to the next higher voltage tap, 21b. The feedback voltage $E_f$ from switch 17 due to this step increase will then be higher than the signal voltage $E_s$, resulting in a polarity reversal of the error voltage $E_e$. This reversed polarity error voltage, amplified by amplifier 12, will cause servo motor 13 to drive in reverse direction to its original motion, and through linkage 14 the motor will drive the feedback potentiometer tap-switch 17 back to contact 21a, when the above process will repeat itself. The tap-switch 17 will oscillate between two taps on the feedback potentiometer while the input signal voltage $E_s$ is changing between the voltage values of these two taps. Therefore, the percentage change of the input signal $E_s$ that takes place over the voltage range of one feed-back potentiometer step would be the value of the non-linearity error of the feedback potentiometer in relation to the input signal.

The oscillation of switch 17 takes place at the end of a contact adjacent to the next contact. If the contacts of potentiometer 16 are laterally displaced one-half the width of a contact from the contacts of potentiometer 15, then the switch 18 will oscillate on a contact 22 and not touch an adjacent contact, so that the output voltage $E_o$ will not contain oscillatory components, but will be a smooth step function of the input voltage $E_s$. This method of displacing the potentiometer elements 15 and 16 is shown in Figure 5. In this figure, the brushes 17 and 18 are mounted in line on insulating bar 43. Conventional electrical networks may be used to provide error signal rate damping and thus minimize the amplitude of brush oscillation.

In using linear wire wound feed back potentiometers the potentiometer pick off brush moves from one wire to another and the magnitude of the change in voltage between successive steps is approximately the same over the entire range of the pot. The percentage change in voltage varies greatly however, as illustrated in Figure 7. In contrast to this is the constant percentage of error, as illustrated in Figure 8, resulting from the use of the present invention.

It can be seen from the above description that the manner of operation of a servo using a tapped feedback potentiometer will be different from that of a servo using a wire wound feedback potentiometer. The contacts 21 are so constructed that tap-switch 17 makes a connection with a contact before breaking the connection with a previous contact. The contacts 21 are therefore designed to overlap, as shown in Figure 4, to provide make before break operation and prevent the introduction of open circuit transient phenomena which would be detrimental to proper servo operation.

It was pointed out above that the percentage change in input signal value that takes place over the range of one step of the feedback potentiometer was the value of the potentiometer non-linearity error. Let us examine the ensuing conditions, under increasing input signal value, when a certain percentage starting value of signal is assumed, and a certain percentage error per step of the feedback potentiometer is also assumed.

Referring to Figure 9, let the starting percentage value of feedback signal=$p$, and the value of the non-linearity error in the first potentiometer step=$\alpha p$ where $\alpha$=the percentage change in the value of $p$ in one step, or non-linearity error, and $a$=amount of signal after $n$ steps.

The amount $a$ at the end of the first step $=p+\alpha p=p$ $(1+\alpha)$. The value of the error in the second potentiometer step $=\alpha[p(1+\alpha)]$. The amount $a$ at the end of the second step $=p(1+\alpha)+\alpha[p(1+\alpha)]=p(1+\alpha)^2$. It follows that the amount $a$ at the end of $n$ steps will be:

$$a=p(1+\alpha)^n \qquad (1)$$

The logarithmic expression of this equation is:

$$\log a = \log p + n \log (1+\alpha) \qquad (2)$$

To find the percentage non-linearity error $\alpha$, given starting value of signal $p$, ending value of signal $a$, and number of steps $n$:

From Equation 2, $n \log (1+\alpha) = \log a - \log p$
Rearranging:

$$\log (1+\alpha) = \frac{\log a - \log p}{n} \qquad (3)$$

To find starting value of signal $p$, given ending value of signal $a$, and number of steps $n$:

From Equation 1, $$p = \frac{a}{(1+\alpha)n}$$

The logarithmic expression of this equation is:

$$\log p = \log a - n \log (1+\alpha) \qquad (4)$$

Equations 2, 3, and 4 above are design equations which must be used to calculate the resistance values used in potentiometers 15 and the above derivation is given in detail to clarify the mathematically logical origin of these design equations. A sample calculation is given below for a hypothetical feedback potentiometer having 30 resistors connected in series or 29 steps in resistance. The feedback potentiometer 15 in Figure 1 is shown as having this number of resistors. In practical designs the number of resistors used is a factor in determining the percentage error of the system, and is a compromise between the factors of space, economy and accuracy desired. The total resistance of the potentiometer will be 100%, and other resistance values will be percentages. In this hypothetical design case, the number of resistors is selected as 30, so that there are 29 steps. A percentage non-linearity error of 7.6% is desired. The values $\alpha=.076$, $n=29$, $a=100$ are substituted in Equation 4, and $p$, the value of the first or starting resistor in the position of resistor 23a in Figure 1, is found to be 11.954% of the total potentiometer resistance.

In calculating the percentage value of resistance at each potentiometer step, the value $p=11.954$, $\alpha=.076$, and $n=$ number of the individual step is substituted in Equation 2. The amount $a$ found for each step is the percentage value of total resistance, and the percentage value of the resistance of the preceding step is subtracted from $a$ to find the value of the individual resistor used in the potentiometer for the step being calculated. By this method, the resistance values of the individual resistors which are connected in series and to the contacts of the feedback potentiometer are determined.

In this design case, the feedback potentiometer voltage output, expressed in percentage, will be 100% of feedback supply voltage E at the last potentiometer tap, and 11.954% at the first potentiometer tap. The input signal voltage will have the same range in order to satisfy the servo requirement of zero error voltage at servo null. The equation giving the output of the error detector is:

$$E_s - E_f = E_e \qquad (5)$$

When the error voltage $E_e$ is zero, $$E_s = E_f \qquad (6)$$

The feedback supply voltage E will be equal to 100% of the signal voltage $E_s$, under these conditions.

The method of calculating the resistance values of the function potentiometer 16, in the same hypothetical case as given for the feedback potentiometer, is best understood by examination of the graph of Figure 6. In Figure 6 the percent of available input signal is plotted on the X axis and the percent of output function potentiometer is plotted on the Y axis. The transfer constant $m$ is the slope of the curve and is derived from the point slope equation:

$$m = \frac{y - y_1}{x - x_1} \qquad (7)$$

Where the Cartesian coordinates of two points are $(x, y)$ and $(x_1, y_1)$. Substituting the values $x=y=100$, $y_1=11.954$ and $x_1=11.954$ into Equation 7 yields a value of slope $m=1.000$. Calculation of the resistor percentage value of the potentiometer on the Y axis of Figure 6 uses the equation:

$$y = m\Delta x \qquad (8)$$

in which equation:

$$\Delta x = a - p \qquad (9)$$

In Equation 9, $p$ is the starting percentage value, or 11.954, and $a$ is the percentage value of the feedback potentiometer resistance at a given step. Thus, at the first contact of the function potentiometer, $p=11.954$, $a=11.954$. Substitution of these values in Equation 9 gives $x=0$, and from Equation 8 $y=11.954$. This is shown in Figure 1 where contact 22a delivers 11.954% output to switch 18. At the second contact of the function potentiometer, $a=12.862$. Thus $x=12.862-11.954=0.908$ by Equation 9. $y=12.862$ by using Equation 8. Therefore the percentage resistance of the total resistance at the first step of the function potentiometer will be 12.862%. Referring to Figure 1, the first resistance of the hypothetical function potentiometer in the position of resistor 24a would have the percentage value of 12.862%. The rest of the function potentiometer percentage values are similarly calculated and the value of the individual resistors are obtained by subtracting the value of the preceding step.

The graph of Figure 6 illustrates the plot of a linear function potentiometer. In Figure 6, the slope $m$ of the straight line function is constant. In many cases, a non-linear function of the input signal may be desired. In these cases, the slopes of individual portions of the function will be different, and the slope $m$ is calculated for the individual portion and used in Equation 8 over the appropriate range of the X axis. There is no difficulty, in this novel translating system, in supplying functions with all types of slope variations. Previous types of translating systems using continuous resistance type potentiometers, have been severely limited in their ability to supply these non-linear function variations.

By slight modifications in the design of this system the constant percentage error of the output function may be appreciably reduced. To clarify the system design and modificaions, two methods of operation will be described. Method A explains the operation of the design already disclosed; to facilitate the explanation the hypothetical figures already established will be used. Method B explains the operation of the modified design and the results of the modification.

Method A: Referring to Figures 10 and 11 it can be seen that while the input signal increases from 11.954% to 12.862% the feedback pot brush oscillates between contacts 21a and 21b and the function pot brush remains on contact 22a which indicates an output function value of 11.954% for an input signal range of 11.954% to 12.862%. At the beginning of this range, when the input signal is 11.954%, the output function indicates this value and there is zero percent error of the output function. At the end of this range, when the input signal is 12.862%, the output function still indicates a value of 11.954% and therefore has a negative percent error of a full step, or 7.6%. As shown in Figures 12 and 13, when the input signal exceeds 12.862%, the feedback pot brush transfers to the junction between contacts 21b and 21c and oscillates between these two contacts while the input signal is within the range between 12.862% and 13.840%. The brush of the output function potentiometer remains on contact 22b which indicates an output function value of 12.862% for an input signal range of 12.862% to 13.840%. At the beginning of this range when the input signal is 12.862% the output function indicates 12.862% and thus has a zero percent error. At the end of this range, when the input signal is 13.840%, the output function still indicates a value of 12.862% and therefore has a negative percent error of a full step or 7.6%.

Successive steps are similar to the first two steps. Each successive step has a maximum negative percent error equal to the value of a step.

Method B: Here the feedback potentiometer design is modified. The first step is changed to a $1/2\alpha \times 100$ percent step while all the remaining steps are full steps or $\alpha \times 100$ percent steps. In the hypothetical case being used, the first feedback pot step will be 3.8% instead of 7.6%. By following the system operation again and referring to Figures 14 through 17, the results of this modification can be easily explained.

While the input signal voltage is within the range 11.954% to 12.408%, the feedback pot brush will oscillate between contacts 21a and 21b. The output function pot brush will be on contact 22a which denotes an output of 11.954%. When the input signal is at 11.954% the output function percent error will be zero and when the input signal is at a value of 12.408% (which is a 3.8% increase) the output function will have a negative percent error of 3.8%. When the input signal exceeds 12.408% the feedback pot brush transfers to the junction of contacts 21b and 21c and oscillates this position while the input signal is within the range 12.408% to 13.351%. The output function pot brush will stay on contact 22b which indicates an output function value of 12.862% for the input signal range of 12.408% to 13.351%. At the beginning when the input signal is 12.408% the output function indicates 12.862% which is a positive percent error of 3.8%. When the input signal reaches a value of 12.862% there will be zero percent error of the output function. As the input signal passes 12.862% the output function percent error becomes negative and reaches a negative value of 3.8% at an input signal value of 13.351%. Thus the output function, on the second step, may be in error plus or minus one-half the percentage of a potentiometer step. Succeeding steps are similar.

The same results can be obtained by changing the feedback potentiometer supply voltage E by one-half the percent error.

Similar modifications in the design may be used to control the amount of negative and positive percent error in the output function. The hypothetical case used here does not show an output function with a full range of a 0 to 100%. This does not exclude the use of such an output function. As was pointed out before, the output function can be varied greatly by using appropriate resistance values in the output potentiometer. The use of zero resistance at tap 22a would cause the range of the output function to vary from 0 to 100%. This would cause the equation for the resistance values to change but would pose no problem to one skilled in the art. The essential feature in the potentiometers is that they are constant percentage step potentiometers. (Excluding steps modified as shown for the purpose of reducing the output function percent error.)

In this novel translating system the design has provided for a constant maximum percentage of error of the output function. To this constant percentage of error the tolerances of the individual resistors comprising the feedback potentiometer and function potentiometer must be added. In the hypothetical case given above, the feedback potentiometer steps were 7.6% and the modifications resulted in an output function non-linearity error of plus or minus 3.8%. If 1% resistors are used in the feedback and function potentiometers than 2% will be added to the 3.8% non-linearity figure, resulting in an over-all error of 5.8% of the output function for all values of input signal.

Figure 8 is a graph showing the characteristic of constant maximum percent error of the output function which is achieved by this novel translating system.

In view of the fact that the feedback potentiometer switch moves a known number of steps and each step denotes a known percentage change in the input signal, this system may be used as an analog to digital converter. The design of appropriate attendant circuitry is not difficult for one skilled in the art. This invention relates only to the actual transformation unit, the constant percentage step servo, and not to an entire information transmission system.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, a plurality of potentiometer contacts, potentiometer brushes for moving over said contacts, said brushes being connected to said mechanical driving means, said potentiometers comprised of individual resistors attached to said contacts, each resistor having a predetermined value with respect to other resistors associated with said potentiometers whereby a constant resistance maximum percentage change is produced as said brushes are driven over said contacts.

2. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, a double row of contacts in both potentiometers, the contacts in one row being staggered with respect to the contacts in the second row, potentiometer brushes for moving over said contacts, said brushes being connected to said mechanical driving means by a mechanical linkage, said potentiometers comprised of individual resistors attached to said contacts, each resistor having a predetermined value with respect to other resistors associated with said potentiometers whereby a constant resistance maximum percentage change is produced as said brushes are driven over said contacts.

3. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts in both potentiometers, the contacts in one row being staggered with respect to the contacts in the second row, the contacts in one row overlapping the contacts in the second row to provide continuous electrical conduction as said brushes are moved over said contacts, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

4. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts and a continuous trolley wire in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

5. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts and a continuous trolley wire between said rows in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

6. In a servomechanism having an error detector to compare input and feedback voltages and a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of rectangular contacts and a continuous trolley wire between said rows in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

7. A servomechanism comprising an error detector to compare input and feedback voltages, a mechanical driving means controlled by the output voltage of said error detector, a feedback potentiometer connected to said error detector, a source of feedback voltage having a predetermined voltage output with respect to the maximum input signal to said error detector an output function potentiometer, a source of output voltage, a double row of contacts in both potentiometers, the contacts in one row being staggered with respect to the contacts in the second row, potentiometer brushes for moving over said contacts, said brushes being connected to said mechanical driving means by a mechanical linkage, said potentiometers comprised of individual resistors attached to said contacts, each resistor having a predetermined value with respect to other resistors associated with said potentiometers whereby a constant resistance maximum percentage change is produced as said brushes are driven over said contacts.

8. A servomechanism comprising an error detector to compare input and feedback voltages, a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts in both potentiometers, the contacts in one row being staggered with respect to the contacts in the second row, the contacts in one row overlapping the contacts in the second row to provide continuous electrical conduction as said brushes are moved over said contacts, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

9. A servomechanism comprising an error detector to compare input and feedback voltages, a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts and a continuous trolley wire in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

10. A servomechanism comprising an error detector to compare input and feedback voltages, a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of contacts and a continuous trolley wire between said rows in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

11. A servomechanism comprising an error detector to compare input and feedback voltages, a mechanical driving means controlled by the output voltage of said error detector, a feedback potentiometer connected to said error detector, a source of feedback voltage having a predetermined voltage output with respect to the maximum input signal to said error detector, an output function potentiometer, a source of output voltage, potentiometer brushes connected to said mechanical driving means by a mechanical linkage, a double row of rectangular contacts and a continuous trolley wire between said rows in both potentiometers, the contacts in one row being staggered with respect to the contacts in the second row, the contacts in one row overlapping the contacts in the second row to provide continuous electrical conduction between said contacts and said trolley wire as said brushes are moved over said contacts and said trolley wire, said potentiometers comprised of individual resistors in series with a connection to individual contacts between each pair of resistors, each said resistor having a predetermined value with respect to other resistors associated with said potentiometers whereby a constant resistance maximum percentage change is produced as said brushes are driven over said contacts.

References Cited in the file of this patent
UNITED STATES PATENTS 2,812,481     Roosdorp _____ Nov. 5, 1957